US012237641B2

(12) United States Patent
Mizrahi et al.

(10) Patent No.: US 12,237,641 B2
(45) Date of Patent: *Feb. 25, 2025

(54) FAST INTENSITY STABILIZATION OF MULTIPLE CONTROLLER BEAMS WITH CONTINUOUS INTEGRATING FILTER

(71) Applicant: IonQ, Inc., College Park, MD (US)

(72) Inventors: Jonathan Albert Mizrahi, Silver Spring, MD (US); Neal Pisenti, Portland, OR (US)

(73) Assignee: IonQ, Inc., College Park, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,744

(22) Filed: Nov. 10, 2023

(65) Prior Publication Data

US 2024/0079845 A1 Mar. 7, 2024

Related U.S. Application Data

(63) Continuation of application No. 16/995,642, filed on Aug. 17, 2020, now Pat. No. 11,855,407.

(Continued)

(51) Int. Cl.
*H01S 3/13* (2006.01)
*G06N 10/00* (2022.01)
*H01S 3/097* (2006.01)

(52) U.S. Cl.
CPC .......... *H01S 3/1305* (2013.01); *H01S 3/1306* (2013.01); *H01S 3/1307* (2013.01); *H01S 3/1308* (2013.01); *H01S 3/09707* (2013.01)

(58) Field of Classification Search
CPC .... H01S 3/1306; H01S 3/1307; H01S 3/1308; H01S 3/09707; H01S 3/1305; G06N 10/00
See application file for complete search history.

(56) References Cited

U.S. PATENT DOCUMENTS 9,858,531 B1 1/2018 Monroe et al.
9,958,710 B1 * 5/2018 Morse .................. G02F 1/11
(Continued)

OTHER PUBLICATIONS

Thom, Joseph, et al., Intensity stabilisation of optical pulse sequences for coherent control of laser-driven qubits, Applied Physics B, Rev. A 62, Jul. 2000, 22 pages.

(Continued)

*Primary Examiner* — Xinning (Tom) Niu
(74) *Attorney, Agent, or Firm* — ARENTFOX SCHIFF LLP (57) ABSTRACT

Aspects of the present disclosure describe techniques for fast stabilization of multiple controller beams with continuous integrating filter. For example, a method is described for intensity stabilization of laser beams (e.g., ion controller beams) in a trapped ion system, where the method includes applying a linear array of laser beams to respective ions in a linear array of ions in a trap, performing, in response to the laser beams being applied, parallel measurements on the ions, the parallel measurements including multiple, separate measurements on each of the ions to identify fluctuations in intensity in the respective laser beams at each ion, and adjusting the intensity of one or more of the laser beams in response to fluctuations being identified from the parallel measurements. A corresponding system for intensity stabilization of laser beams in a trapped ion system is also described.

20 Claims, 8 Drawing Sheets

Related U.S. Application Data (60) Provisional application No. 62/888,668, filed on Aug. 19, 2019.

(56) References Cited

U.S. PATENT DOCUMENTS

| | | | |
|---|---|---|---|
| 11,855,407 B2* | 12/2023 | Mizrahi | ............... H01S 3/1307 |
| 2017/0301526 A1 | 10/2017 | Sanford et al. | |
| 2020/0036450 A1 | 1/2020 | Deymier et al. | |
| 2020/0369517 A1* | 11/2020 | Nam | ........................ H01S 3/09 |

OTHER PUBLICATIONS

Landsman, Kevin Antony, Construction, Optimization, and Applications of a Small Trapped-Ion Quantum Computer, University of Maryland, College Park, 2019, 195 pages.

Figgatt, Caroline Margaret, Building and Programming a Universal Ion Trap Quantum Computer, University of Maryland, College Park, 2018, 211 pages.

International Search Report and Written Opinion for PCT/US2020/046826, dated Nov. 26, 2020, 13 pages.

* cited by examiner

FAST INTENSITY STABILIZATION OF MULTIPLE CONTROLLER BEAMS WITH CONTINUOUS INTEGRATING FILTER

CROSS REFERENCE TO RELATED APPLICATIONS

The current application is a continuation of U.S. patent application Ser. No. 16/995,642, filed Aug. 17, 2020, which claims priority to U.S. Provisional Application No. 62/888,668 filed on Aug. 19, 2019, entitled "Fast Intensity Stabilization of Multiple Controller Beams with Continuous Integrating Filter," the contents of each of which are incorporated by reference in their entirety.

BACKGROUND

Aspects of the present disclosure relate generally to stabilization of laser beam intensity, and more specifically, to fast stabilization of multiple controller beams with continuous integration.

In a trapped ion quantum computer or a quantum information processing (QIP) system, a linear array of laser beams is focused down onto a linear array of ions. Each laser beam is tightly focused onto a respective ion to provide some control of that ion. The laser beams have approximately a diameter of 1 micron ($\mu m$) to 1.5 $\mu m$ at the ion position, while the separation between ions can be approximately 5 $\mu m$.

In order for the quantum computer or QIP system to work properly, it is important that the intensity of light of each laser beam on each ion remains constant. There are many reasons that may cause the intensity of the laser beam to change, for example, the laser beam or ion may move, decreasing the intensity at the ion position, or the power of the laser beam itself may change. In some instances, changes in a trap holding the ion can cause the ion to move to a different spot where the intensity of the laser beam is different. Changes in the laser beam or the ion in the order of tens or hundreds of nanometers can have a severe impact in system performance. Gradients in air pressure across the laser beam may create destructive interference at the focus (e.g., at the narrowest point of the laser beam, which is ideally where the ion is located), causing a reduction in the intensity of the laser beam. It is therefore critical to monitor and stabilize the laser beam intensity over time.

One solution is to monitor the power of the laser beam with a photodiode, and then provide feedback of the measurement to adjust an amplitude of a radio frequency (RF) signal applied to an acousto-optic modulator (AOM) that controls the laser beam to stabilize the power of the laser beam. The intensity of a laser beam may refer to an amount of power per unit area, accordingly, the terms "intensity" and "power" as it relates to laser beams may be used interchangeably in this disclosure. The technique of monitoring the laser power with a photodiode, however, does not correct for any intensity change due to laser beam pointing fluctuations, ion position fluctuations, or air pressure fluctuations. Moreover, it only stabilizes the power of the laser at the position of the photodiode, it does not account for any fluctuations induced in the laser beam path after the photodiode and closer to the respective ion of the laser beam.

It is therefore desirable to use techniques that allow for more accurate measurements closer to the ion. One way to do so is to actually measure the intensity or power of the laser beam with the ion itself, and use those measurements to control the intensity of the laser beam. The laser beam intensity may be periodically calibrated by scanning it over some range while looking at the ion response. The results from the scanning need to be fitted before an optimal intensity point is selected from the scan. The laser beam intensity is set to the value at the optimal point until the next calibration run. This process is typically quite slow, with a calibration taking 30 seconds to a minute, and therefore cannot be run more often than once every 10 minutes or so. There is a significant amount of noise that is fluctuating on timescales faster than this 10 minute interval, and the type of calibration process described above cannot correct for any of it.

Novel techniques are needed where faster stabilization or control of the intensity or power of laser beams that are applied to ions can be achieved while still allowing for the measurements to be made at or close to the ion whose laser beam is being controlled.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of this disclosure, a method for intensity stabilization of laser beams in a trapped ion system is described that includes applying a linear array of laser beams to respective ions in a linear array of ions in a trap, performing, in response to the laser beams being applied, parallel measurements on the ions, the parallel measurements including multiple, separate measurements on each of the ions to identify fluctuations in intensity in the respective laser beams at each ion, and adjusting the intensity of one or more of the laser beams in response to fluctuations being identified from the parallel measurements.

In another aspect of this disclosure, a system for intensity stabilization of laser beams in a trapped ion system is described that includes laser sources configured to apply a linear array of laser beams to respective ions in a linear array of ions in a trap, an imaging system configured to perform, in response to the laser beams being applied, parallel measurements on the ions, the parallel measurements including multiple, separate measurements on each of the ions to identify fluctuations in intensity in the respective laser beams at each ion, and an optical controller configured to adjust the intensity of one or more of the laser beams in response to fluctuations being identified from the parallel measurements.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

An objective of the present disclosure is to perform a fast experiment to measure the response of individual ions to respective laser beams at the conclusion of an experimental cycle (e.g., every few milliseconds) in order to stabilize the laser beam intensity as often as possible over time. By performing these fast calibration or stabilization techniques, it is possible to compensate for fluctuating on timescales that are faster than the 10 minute intervals used in current periodic calibrations. In some cases, the measurements may be taken after each of several experimental cycles. The results of these measurements may be used to increase or decrease the intensity of each of the laser beams, if needed and as appropriate, via an RF amplitude driving a channel in an AOM (e.g., a multi-channel AOM). Because the system is configured to separately detect the response of every ion, and because there is a separate AOM channel driving every laser beam on every ion, all of the laser beam intensities can be measured and calibrated or stabilized in parallel (e.g., concurrently, at the same time). The present disclosure therefore enables making many measurements and feeding back the results of those measurements to control the intensity on many laser beams in parallel. Moreover, to avoid shot noise caused by the measurements, the present disclosure describes techniques to filter out such noise, where one example include the use of an integrating filter to remove shot noise.

Figure 1:
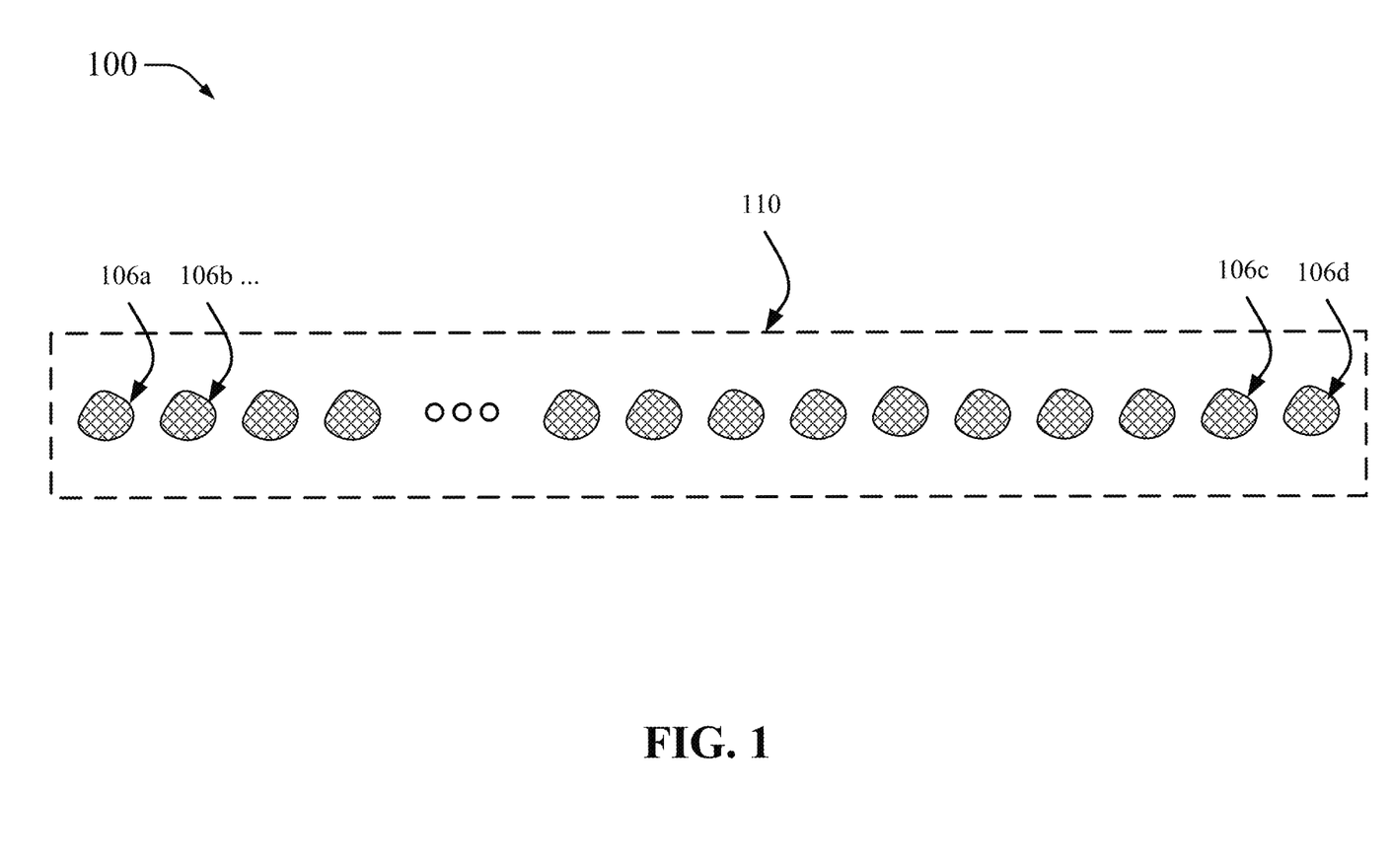
FIG. 1 illustrates a view of a trapping of atomic ions a linear crystal in accordance with aspects of the disclosure.

In a trapped ion quantum computer, trapped ion system, or a QIP system, the ability to individually address each ion may be needed to control the phase, frequency, and/or amplitude, and/or also the polarization, as required by a particular quantum gate or experiment to be implemented using the ion. Some trapped ion systems have, for example, 32 individually controlled ions, but this number could be dynamically adjusted to be less or more, in some cases as high a 100 ions or more. This same ability to individually address each ion may also be useful to perform independent measurements in each ion such as the experiments proposed herein to perform fast calibration or stabilization of laser beam intensity. In systems that support individual ion control, a single global laser beam may be applied or provided to all of the ions in an ion chain (e.g., a chain or linear arrangement of ions in an ion trap, see e.g., FIG. 1) to control the ions, while also applying or providing individual laser beams to those ions on which quantum gates, experiments, or measurements are to be performed or implemented. These counter-propagating optical beams, referred to as Raman optical beams or simply as Raman beams, are typically laser beams with a very high center frequency (e.g., 850 THz). These laser beams, however, have a well-defined frequency difference that produces a beatnote (e.g., 12.6 GHz), that is used as the qubit frequency. RF signals are used to control the frequency or the phase of the beatnotes produced by the laser beams, where the beatnotes are then used to drive the qubits (e.g., atomic or ion qubits) in the ion chain. As used in this disclosure, the terms "atomic ions," "atoms," and "ions" may be used interchangeably to describe the particles that are to be confined, or are actually confined, in a trap to form a crystal, linear, or similar arrangement or configuration. This type control has been implemented in the past by using the single global laser beam as the means to adjust the frequency or phase of the beatnotes, but this approach has some limitations and therefore systems in which the individual laser beams are used to control the ions are preferable.

Accordingly, the states of the trapped ions may be controlled using Raman transitions where the beatnote between two Raman laser beams may be used to coherently drive the internal qubit states. When controlling individual trapped ions in a quantum computer or QIP system, an array of addressing laser beams is generated, one laser beam for each single trapped ion. By using a multi-channel AOM, each of the addressing laser beams in the array can be controlled to have the ability to, for example, individually correct for any systematic errors that are collected by the trapped ions or to perform measurements on the ions. It is to be understood that while a multi-channel AOM is referred to herein for individual trapped ion control, the disclosure need not be so limited and the multi-channel AOM may be implemented using multiple single-channel AOMs or multiple smaller multi-channel AOMs. A number of arbitrary waveform generators (AWGs) or direct digital synthesizers (DDSs) may be used with the multi-channel AOM, where each AWG/DDS independently controls a channel of the AOM for a respective addressing laser beam.

In connection with the approach described above, FIG. 1 shows a diagram 100 that illustrates multiple atomic ions 106a-106d trapped in a linear or one-dimensional arrangement, e.g., a linear crystal 110, using a linear RF trap such as a linear RF Paul trap (the linear crystal 100 can be inside a vacuum chamber not shown). The linear crystal 110 may also be referred to as an ion chain, for example. In the example shown in FIG. 1, the trap may include electrodes for trapping multiple atomic Ytterbium ions (e.g., $^{171}Yb^+$ ions) which are confined in the linear crystal 110 and are laser-cooled to be nearly at rest. It is to be understood that the techniques described herein are applicable to a wide range of atomic ions other than Ytterbium ion, and therefore, the disclosure need not be limited to the use of Ytterbium ions. The number of atomic ions trapped can be configurable and more or fewer atomic ions may be trapped. In an example, the number of ions that may be trapped is N, where N>1 and where N is a number as large as 100 or even larger, with some implementation having N=32 as mentioned above. The atoms are illuminated with laser (optical) radiation tuned to a resonance in $^{171}$Yb$^+$ and the fluorescence of the atomic ions is imaged onto a camera. In this example, atomic ions are separated by about 5 microns (m) from each other as may be shown by fluorescence. The separation of the atomic ions is determined by a balance between the external confinement force and Coulomb repulsion. While the atomic ions 106a-106d may be trapped for computations or experiments, the atomic ions 106a-106d may also be used as described herein to make measurements on their respective laser beams to stabilize the intensity of those laser beams.

Figure 2A:
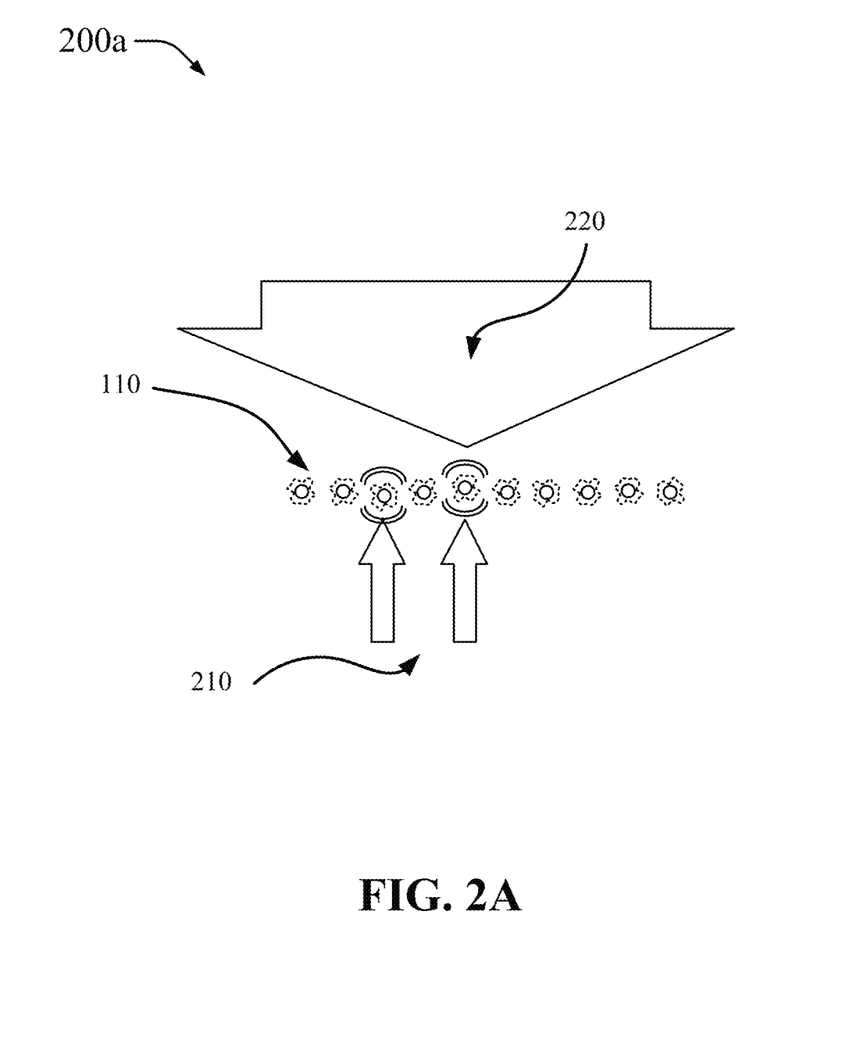
FIG. 2A is a diagram illustrating an example of Raman beam geometry in accordance with aspects of the disclosure.

FIG. 2A shows a diagram 200a illustrating an example of Raman beam geometry. In the diagram 200, there are individual laser beams 210 (e.g., one for each atomic ion) and a global laser beam 220 directed to a linear crystal or chain, such as the linear crystal 110, having a linear array of atomic ions or qubits. The measurement techniques described herein may be used to control the intensity of the laser beams 210 so that the intensity in each of the individual laser beams 210 is stable, at least from the perspective of the respective ion. Laser beams that propagate or travel in the same direction may be referred to as co-propagating laser beams and the laser beams that propagate or travel in different or opposite directions may be referred to as non-co-propagating or counter-propagating laser beams, respectively. The laser beams 210 (co-propagating) are focused or individually addressed laser beams for respective atomic ions, while the global laser beam 220 (which, as shown, counter-propagates with respect to the laser beams 210) may be a global beam, which is typically focused to a wide, elliptical spot that covers all of the ions. As used herein, the terms "laser beams," "optical beams," "beams," "lasers," "optical fields," and "fields" may be used interchangeably. Moreover, as used herein, the terms "atoms," "atomic ions," and "ions" may also be used interchangeably.

Figure 2B:
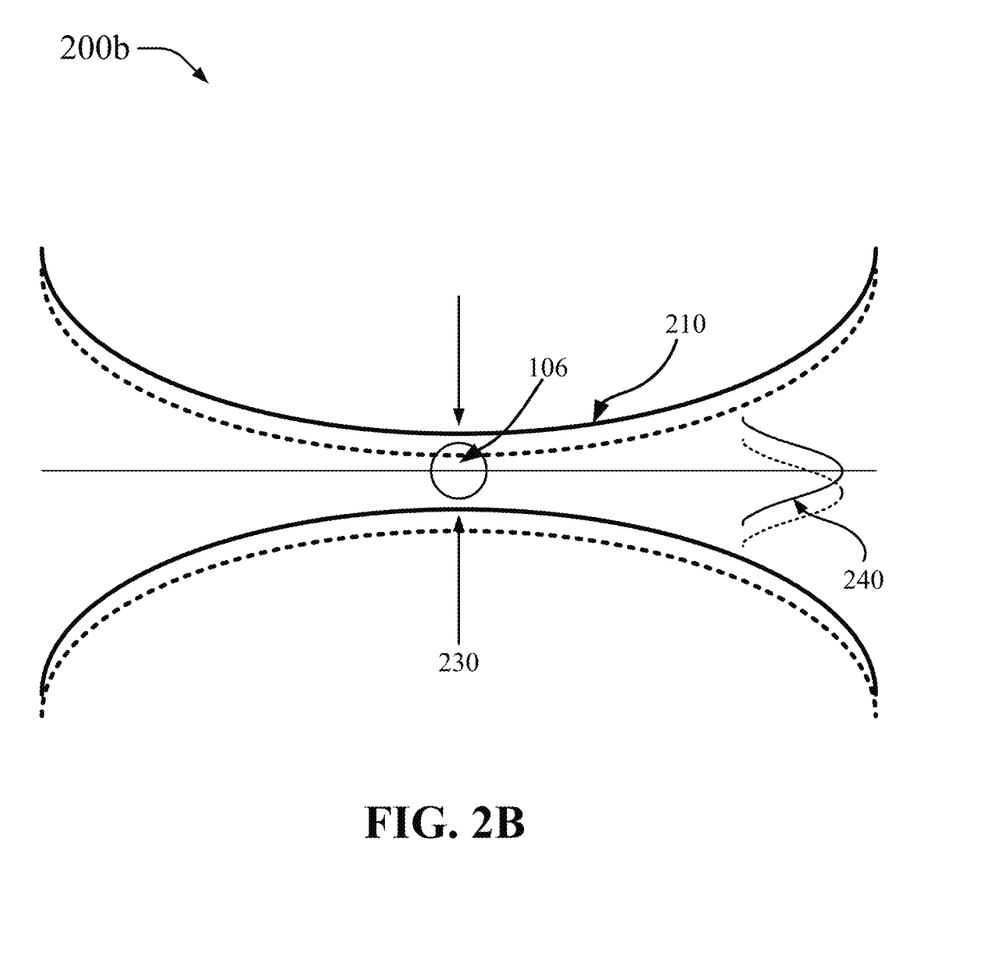
FIG. 2B is a diagram illustrating an example of fluctuations in laser beam or ion position resulting in intensity fluctuations at the ion in accordance with aspects of the disclosure.

FIG. 2B shows a diagram 200b illustrating an example of fluctuations in laser beam or ion position resulting in intensity fluctuations at the ion. In this example, a laser beam 210 (e.g., an individual addressing laser beam) is focused at the location or position of the ion 106 (solid lines). A diameter 230 of the focused portion of the laser beam 210 is approximately 1 µm to 1.5 µm in diameter. An intensity profile 240 to the right of the diagram 200b shows the ion 106 being aligned with a highest point in the intensity profile 240.

A change in the position of the ion 106 or a change in the position of the laser beam 210 (dashed lines) would change where the ion 106 aligns with the intensity profile 240, resulting in a lower intensity of the laser beam 210 as seen by the ion 106.

The techniques described herein are used to correct for these types of fluctuations by changing the intensity of the laser beam 210, where the intensity may be increased or decreased in order for the ion 106 to see a stable or constant laser beam intensity over time.

Figure 3:
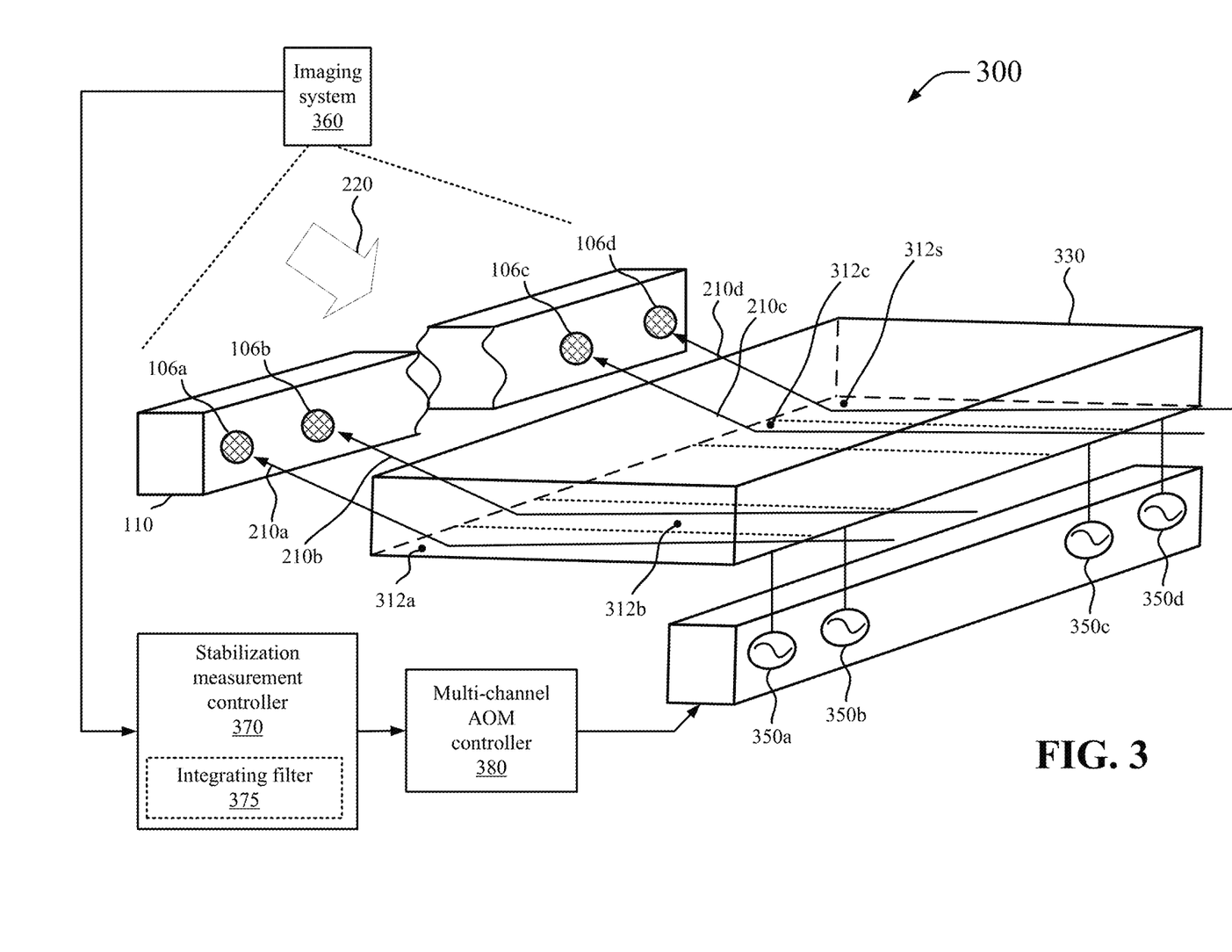
FIG. 3 is a diagram illustrating an example of a multi-channel acousto-optic modulator (AOM) for multi-qubit control in accordance with aspects of this disclosure.

FIG. 3 shows a diagram 300 that illustrates a portion of a trapped ion quantum computer or QIP system that may be used to perform measurements for fast stabilization of multiple controller laser beams with continuous integration for multiple measurements. While four ions 106a-106d are shown trapped in the linear crystal 110 as illustrated in the diagram 300 in FIG. 3, the linear crystal 110 may have fewer or more ions and it may be possible to measure the full set or any subset of the ions for stabilizing their respective laser beam intensities. Also shown in the diagram 300 are a multi-channel AOM 330, waveform generators 350a-350d, an imaging system 360, a stabilization measurement controller 370, and a multi-channel AOM controller 380. In an example, the AOM 330 may be multi-channel Bragg cell having transducers 312a-312d (e.g., piezo-electric transducers) in a parallel arrangement that locally apply acoustic waves to the AOM 330 to adjust one or more characteristics (e.g., intensity) of the respective individual addressing laser beams 210a-210d applied to the transducers. These laser beams 210a-210d may also be referred to as controller laser beams or simply controller beams since they control aspects of operating and measuring the ions 106a-106d. Moreover, the laser beams 210a-210d may be referred to as a linear array of laser beams because of their linear arrangement used to match the linear arrangement of the ions 106a-106d in the linear crystal 110. The AOM 330 may include a different channel (e.g., a separate transducer) for use with each of the ions 106a-106d and their respective laser beams 210a-210d. In this example, four channels are shown having transducers 312a-312d, which may be controlled by respective waveform generators 350a-350d. The waveform generators 350a-350d may be arbitrary waveform generators (AWGs) and/or direct digital synthesizers (DDSs), or some other type of signal generating device.

During operation, in some implementations, the global laser beam 220 may be provided to the ions 106a-106d from a first direction. The laser beams 210a-210d may be provided to separately or individually illuminate some or all of the ions 106a-106d from a second direction. During quantum operations, for example, the ions that are illuminated depend on the quantum gate(s) being implemented in a current stage of a sequence that is part of the quantum operation or algorithm. During calibration or stabilization, the ions that are illuminated depend on which laser beam intensities are being measured for calibration or stabilization. In the example shown in the diagram 300, the laser beam 210a may illuminate or be focused on the ion 106a, the laser beam 210b may illuminate or be focused on the ion 106b, the laser beam 210c may illuminate or be focused on the ion 106c, and the laser beam 210d may illuminate or be focused on the ion 106d. In some examples, some ions in the linear crystal 110 may not be illuminated by any laser beam and laser beam intensity stabilization measurements may be performed in parallel using only those ions that are illuminated. In other implementations, it may be advantageous to illuminate all the ions in the linear crystal 110 to perform laser beam intensity stabilization measurements on all of those ions in parallel.

It is to be understood that while the diagram 200a in FIG. 2A and the diagram 300 in FIG. 3 use a global laser beam 220 in one direction and a set of individual addressing laser beams 210 in another direction, it is also possible to instead use two sets of individual addressing laser beams, one set in one direction and another set in another direction (e.g., at different angles or opposite sides of the trap).

Still referring to FIG. 3, in certain implementations, certain characteristics of each of the laser beams 210a-210d may be individually modulated by the AOM 330. For example, the waveform generator 350a may generate and/or control the generation of an RF signal that causes a transducer 312a in one of the channels of the AOM 330 to generate an acoustic wave to control characteristics (e.g., frequency, amplitude, and/or phase) of the laser beam 210a incident on the transducer 312*a*. By controlling a frequency of the laser beams 210*a*, a difference of that frequency and a frequency of the global laser beam 220 may be used to create a beatnote that in turn controls the state of the ion 106*a*. The waveform generator 350*a* may dynamically vary the RF signal to change the characteristics of the laser beam 312*a* over time. For example, an amplitude of the RF signal may be used to control the intensity and/or power of the laser beam 210*a* that is applied to the ion 106*a* and the waveform generator 350*a* may be able to dynamically adjust or vary the amplitude of the RF signal to change the intensity based on the types of computations or experiments being performed. This feature may also be used to stabilize the intensity of the laser beam 210*a*.

A similar approach as described above may be carried out with respect to the waveform generators 350*b*-350*d*, the transducers 312*b*-312*d*, and the laser beams 210*b*-210*d*. In other words, the intensity of each of the laser beams 210*b*-210*d* may be individually and dynamically controlled by controlling an amplitude of the RF signal applied to the respective channel (e.g., the respective transducer) in the AOM 330.

Also shown in the diagram 300 in FIG. 3 is the imaging system 360 configured to image and analyze the effects of the interaction between the linear array of laser beams 210*a*-210*d* and their respective linear array of ions 106*a*-106*d*. The imaging system 360 may be used as part of the measurements made for fast stabilization of the laser beams 210*a*-210*d*. For example, the imaging system 360 may be used to detect a brightness (or lack thereof) of each of the ions 106*a*-106*d*, and to assign a value of "O" to an ion in a dark state and a value of "1" to an ion in a bright state, for example.

The diagram 300 in FIG. 3 also shows a stabilization measurement controller 370 that may be configured to control the fast experiments used to measure the response of individual ions to respective laser beams at the conclusion of an experimental cycle (e.g., every few milliseconds) in order to stabilize the laser beam intensity as often as possible over time. The stabilization measurement controller 370 may be configured to control one or more of scheduling of the measurements (e.g., when and for how long the measurements are to be made), the measurements to be made (e.g., which and how many measurements to be made, on which ions, and how the ions are to be prepared for making the measurements), and processing of the measurements (e.g., to determine whether adjustments to the intensity of the laser beams are needed). The stabilization measurement controller 370 may also be configured to generate instructions to the multi-channel AOM controller 380 to control the adjustment, when necessary, of the RF signals being generated by the waveform generators 350*a*-350*d*, which are in turn applied to the channels in the AOM 330 to modify the intensity of the laser beams 210*a*-210*d*. In one example, the stabilization measurement controller 370 may include an integrating filter 375 configured to integrate (e.g., continuously integrate) the measurements results over time for getting a more accurate representation of any fluctuations in the laser beam intensities at the ions 106*a*-106*d*. The integrating filter 375 may effectively be used to set up thresholds such that when too many measurements for a particular ion indicate that a lower than desired laser beam intensity is being measured, the stabilization measurement controller 370 provides instructions to the multi-channel AOM controller 380 to increase the intensity of the respective laser beam by adjusting the amplitude of the RF signal of the respective waveform generator. Similarly, when too many measurements for a particular ion indicate that a higher than desired laser beam intensity is being measured, the stabilization measurement controller 370 provides instructions to the multi-channel AOM controller 380 to decrease the intensity of the respective laser beam by adjusting the amplitude of the RF signal applied to the respective channel in the AOM 330.

In some implementations, some or all of the functionality of the stabilization measurement controller 370 and/or the integrating filter 375 may be implemented as part of the multi-channel AOM controller 380, the imaging system 360, or some in the imaging system 360 and some in the multi-channel AOM controller 380.

The trapped ion quantum computer or QIP system shown in the diagram 300 in FIG. 3 is sufficiently flexible to not only perform quantum computations and experiments, but to also perform experiments or measurements for fast stabilization of multiple controller laser beams (e.g., the laser beams 210*a*-210*d*) with continuous integration. That is, the system is capable of performing a fast experiment to measure the response of the linear array of ions 106*a*-106*d* to the linear array of laser beams 210*a*-210*b* at the conclusion of one or more consecutive experimental cycles, where the measurement results are used to increase or decrease laser beam intensity by adjusting the amplitude of the RF signals driving the AOM 330. Because the system can separately detect the response of each ion, and because there is a separate channel in the AOM 330 driving the corresponding laser beam for each ion, all of the laser beam intensities can be measured and/or can be adjusted in parallel.

One proposed approach for each of the measurements to be made (e.g., on each ion may proceed as follows. First, each ion in the chain that is to be measured is prepared in the quantum state $|0\rangle$. Next, the respective laser beam of each ion to be measured is turned on for a fixed length of time t, with frequency set so as to drive Rabi flopping between the $|0\rangle$ and $|1\rangle$ quantum states. The time t for which each of the laser beams is on is set such that if the laser beam power or intensity is correct, the respective ion is driven into an equal superposition of the $|0\rangle$ and $|1\rangle$ quantum states. The state of each ion is then measured as either a "0" or a "1", where the "1" is indicative of a bright state of the ion and the "0" is indicative of a dark state of the ion. Further details regarding this approach are described in more detail below.

A Rabi flop or Rabi cycle is a cyclic behavior of a two-level quantum system in the presence of a oscillatory field. An atom or ion, for example, when illuminated by a laser beam could cyclically absorb photons from the laser beam and move to one level, and then re-emit the photons and move back to the other level. This behavior is reflected in what are called Rabi oscillations, which show the probability that the two-level quantum system that is in a first quantum state (e.g., quantum state $|0\rangle$ ) would end up in a second quantum state (e.g., quantum state $|1\rangle$ ). The duration of a Rabi cycle and the inverse of its duration is referred to as a Rabi frequency of the laser beam.

Figure 4:
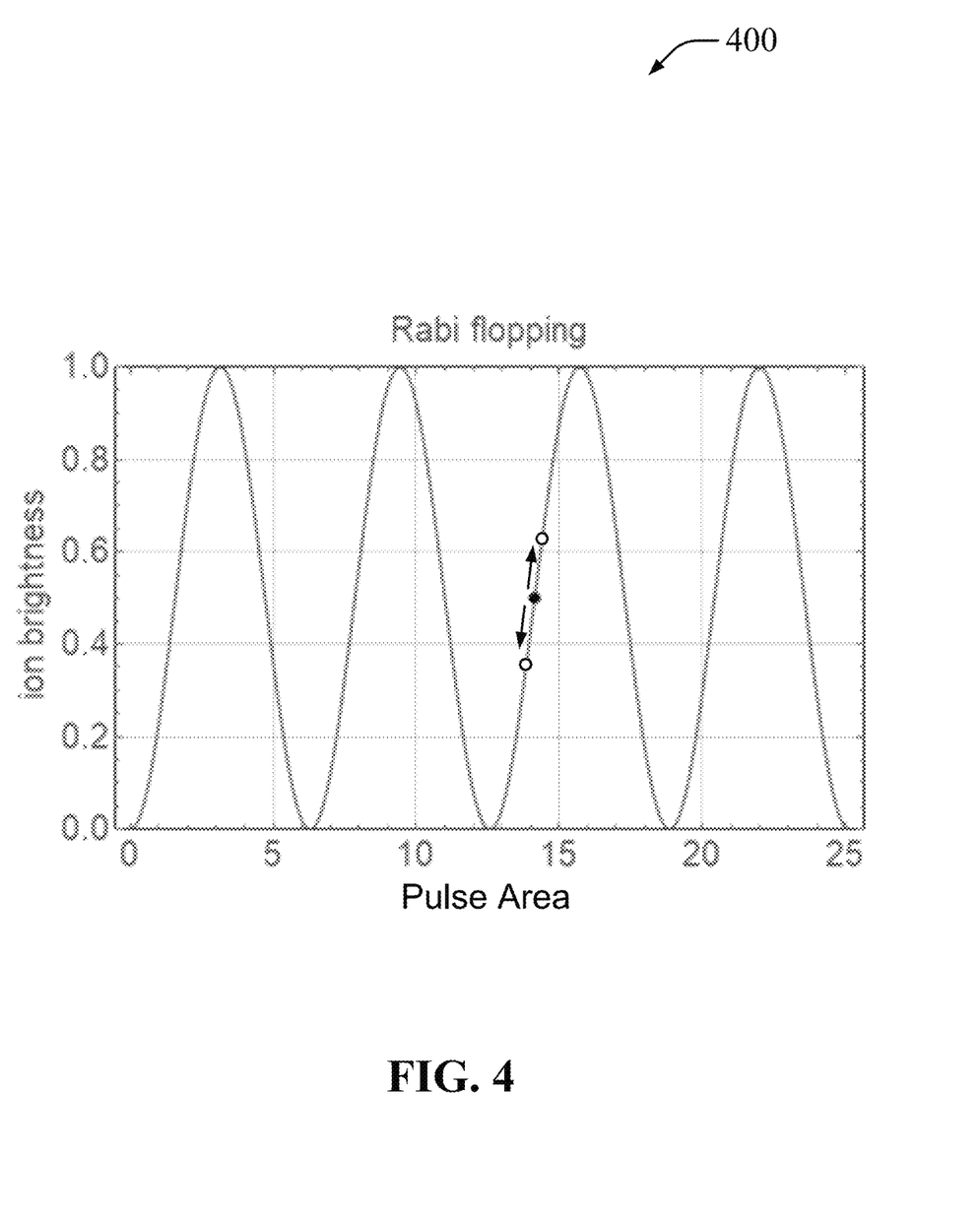
FIG. 4 is a diagram illustrating ion brightness in response to pulse area in accordance with aspects of the disclosure.

FIG. 4 shows a diagram 400 with an example of Rabi flopping that illustrates ion brightness (vertical axis) in response to pulse area (horizontal axis), which is proportional to the laser beam intensity and the time t. The diagram 400 shows as scanning of the intensity of a laser beam (e.g., one of the laser beams 210*a*-210*d*). The pulse area, that is, the horizontal axis of the diagram 400, is a parameter that is proportional to the intensity (I) and to the fixed amount of time the laser beam is applied, t. The ion brightness, that is, the vertical axis of the diagram 400, which may be detected by the imaging system 360, for example, is an oscillatory or sinusoidal behavior that corresponds to sin(k·I·t), where k is a proportionality factor, and I and t are as described above.

As described above, the proposed approach for each of the measurements to be made includes having an ion prepared in an initial quantum state, e.g., the quantum state $|0\rangle$, and set the amount of time t for the application of the laser beam to drive Rabi flopping between the $|0\rangle$ and $|1\rangle$ quantum states. If the intensity is selected properly, and the respective ion is driven into an equal superposition of the $|0\rangle$ and $|1\rangle$ quantum states, then the operating point (shown by a black dot) will be at the 50% level of ion brightness (or 0.5 in the vertical scale) as there would be as many bright state ("1") as dark state ("0") measurements for that ion at that intensity. When the measurements start to show that there are more bright states (e.g., "1"s detected for the ion by the imaging system 360) than dark states (e.g., "0"s detected for the ion by the imaging system 360), then the operating point (black dot) will move up the curve (white dot) to a higher ion brightness. In this case, the calibration or stabilization operation may require a decrease in the amplitude of the RF signal that controls the channel in the AOM 330 that modifies the intensity of the laser beam. When the measurements start to show that there are more dark states (e.g., "0"s detected for the ion by the imaging system 360) than bright states (e.g., "1"s detected for the ion by the imaging system 360), then the operating point (black dot) will move down the curve (white dot) to a lower ion brightness. In this case, the calibration or stabilization operation may require an increase in the amplitude of the RF signal that controls the channel in the AOM 330 that modifies the intensity of the laser beam.

In the example shown in the diagram 400, the duration for which each laser beam is turned on is set such that the intensity of the laser beam is correct and the ion will be measured in a bright state (e.g., the $|1\rangle$ quantum state) 50% of the time, as indicated by the black dot being in the middle of the ion brightness range (e.g., 0.0-1.0). In this particular case, the time t is set to drive a $9\pi/2$ pulse (e.g., pulse area is k·I·t), although any odd multiple of $\pi/2$ would also work. It is possible to set the time t to drive pulses that need not be odd multiples of $\pi/2$, however, using odd multiples of $\pi/2$ may maximize sensitivity to intensity fluctuations. If the intensity increases or decreases, the pulse area does the same, and the black dot may move up or down the sine curve representative of the Rabi flopping, that is, away from the case where the ion is measured in the bright state 50% of the time. For small intensity fluctuations (e.g., small changes about the black dot), this response is approximately linear. Another aspect of flexibility that the proposed approach provides is that higher odd multiples of $$\frac{\pi}{2}$$

for the pulses are more sensitive to fluctuations in intensity than lower odd multiples of $$\frac{\pi}{2}.$$

This allows for an optimal pulse to be selected for use when adjusting the laser beam intensity.

Because each of the measurements made on a particular ion returns either a "0" or "1", these measurements can have significant shot noise. Therefore, it is helpful to pass these measurements through an integrating filter (or multiple integrating filters), so that a number of separate measurements are integrated to better identify intensity fluctuations. One implementation to achieve shot noise reduction through continuous integration may be as follows.

As described above in connection with the diagram 300 in FIG. 3, the intensity of the laser beams (e.g., the laser beams 210a-210d) may be controlled by controlling an amplitude of the RF signal that modulates each of the laser beams by way of a respective channel/transducer in the AOM 330. The multi-channel AOM controller 380, or a combination of the stabilization measurement controller 370 and the multi-channel AOM controller 380, may be used to provide instructions for controlling the amplitudes of the RF signals generated by the waveform generators 350a-350d.

In one implementation, the amplitude of each RF signal may be physically determined by a 16 bit number (or some M-bit number). This digital number may be referred to as the physical number or physical bit that are provided to the waveform generators 350a-35d to generate the appropriate amplitude for the RF signal, and therefore the appropriate laser beam intensity. In one example, the multi-channel AOM controller 380 may provide each of the waveform generators 350a-350d with its respective physical number (e.g., 16-bit number), that is, a digital number that is representative of the amplitude of the RF signal to be generated by each of the waveform generators 350a-350d. The digital numbers for the different RF signal amplitudes may be provided to the multi-channel AOM controller 380 by the stabilization measurement controller 370

However, internal to the stabilization measurement controller 370, which may be implemented by means of a field programmable gate array (FPGA) or an application specific integrated circuit (ASIC), the amplitude for each RF signal, and therefore for each ion i can be determined instead based on a 32-bit number (or some 2M-bit number), $A_i$. In general, $A_i$ need not be limited to a 2M-bit number but could be any (M+N)-bit number, where both M and N are integers. The 16 least significant bits (LSBs) of $A_i$ do not impact the amplitude of the respective RF signal since they are truncated out for output (that is, the 16 MSBs of $A_i$ are the physical bits and the 16 LSBs of $A_i$ are non-physical bits). The stabilization measurement controller 370 determines a second digital number, $B_i$, for each ion i that is a gain of a feedback loop of the measurements and is 16 bits or less. The second digital number, $B_i$, in a way represents the results of the integrating filtering performed by integrating filter 375 where multiple measurements are made to determine whether the amplitude of the respective RF signal needs to be increased or decreased. In one example, $A_i$ is the amplitude for ion i in the form of a 32-bit number, which can be based on a base amplitude $A_0$ and a proportionality factor K for the feedback gain that is less than 1 (e.g., less than 1 integral gain). In the examples described herein, when the second digital number, $B_i$, is 16 bits, the proportionality factor can be equal to $1/16$. The integration operation provides the second digital number, $B_i$. In this formalism, $S(t)$ is determined by a series of "1"s and "0"s, for example, $S(t)=1$ if the measurement at time t is "1", and $S(t)=-1$ if the measurement at time t is "0". The proportionality factor is a tunable parameter of the stabilization system, one that is tunable by the value of Bt. Because the numbers being integrated are "1"s and "0"s, the integration is merely as sum of the numbers being integrated. Overall, when the numbers of "1"s exceeds the numbers of "0"s by 16 or more samples during an integration period, then the amplitude $A_i$ is adjusted in one direction to bring the intensity down the curve and back to the black dot as shown in the Rabi flopping diagram in FIG. 4. When the numbers of "0"s exceeds the numbers of "1"s by 16 or more samples during an integration period, then the amplitude $A_i$ is adjusted in an opposite direction to bring the intensity up the curve and back to the black dot as shown in the Rabi flopping diagram in FIG. 4.

In other words, after each measurement on the ion i, if the measurement is a "0" (e.g., a dark state measurement), a value of the digital number $A_i$ for the ion i is replaced by a value of $A_i+B_i$, while if the measurement is a "1" (e.g., bright state measurement), a value of the digital number $A_i$ for the ion i is replaced by a value of $A_i-B_i$, where this is done to adjust the amplitude of the RF signal used to control the intensity of the laser beam used with each ion i. Since $B_i$ is added to the 16 LSBs of $A_i$, a single measurement in $B_i$ does not affect the top 16 MSBs of $A_i$, that is, this has no impact on the physical amplitude, as it only impacts the non-physical bits of $A_i$. If the ion is in an equal superposition of "0" and "1", then statistically there will be an equal number of "0" measurements and "1" measurements, and the physical amplitude will stay nearly constant (for sufficiently small $B_i$). That is, when there is an equal number of "0" measurements and "1" measurements, the measurements that are processed by, for example, the integrating filter 375, integrate to zero or near. However, if the ion superposition is unbalanced (e.g., an unequal number of "0" measurements and "1" measurements), the integrating filter 375 will eventually push the physical bits of $A_i$ in a direction so as to stabilize the power or intensity of the respective laser beam. In this case, when there are significant more "1"s than "0"s or significantly more "0"s than "1"s, the value of $B_i$ may be large enough than when replacing the value of $A_i$ by the value of $A_i+B_i$ or by the value of $A_i-B_i$, this has an impact on the physical bits of $A_i$ and therefore the physical amplitude of the respective RF signal.

As described above, this process can be performed in parallel for all the laser beams. Moreover, because the measurements can be performed in parallel these measurements and their feedback stabilization mechanism can take less than 1 millisecond (<1 ms) and can therefore be interleaved between experimental cycles and run every few milliseconds. This provides a relatively fast feedback loop that can cancel both slow drifts and faster timescale fluctuations than what can be achieved today. Moreover, while the feedback stabilization mechanism described herein has been described in connection with an integrating filter, it is to be understood that the feedback stabilization mechanism is not so limited and that it is more generally applicable to more complex filter functions with the integrating filter being a particular implementation.

Figure 5A:
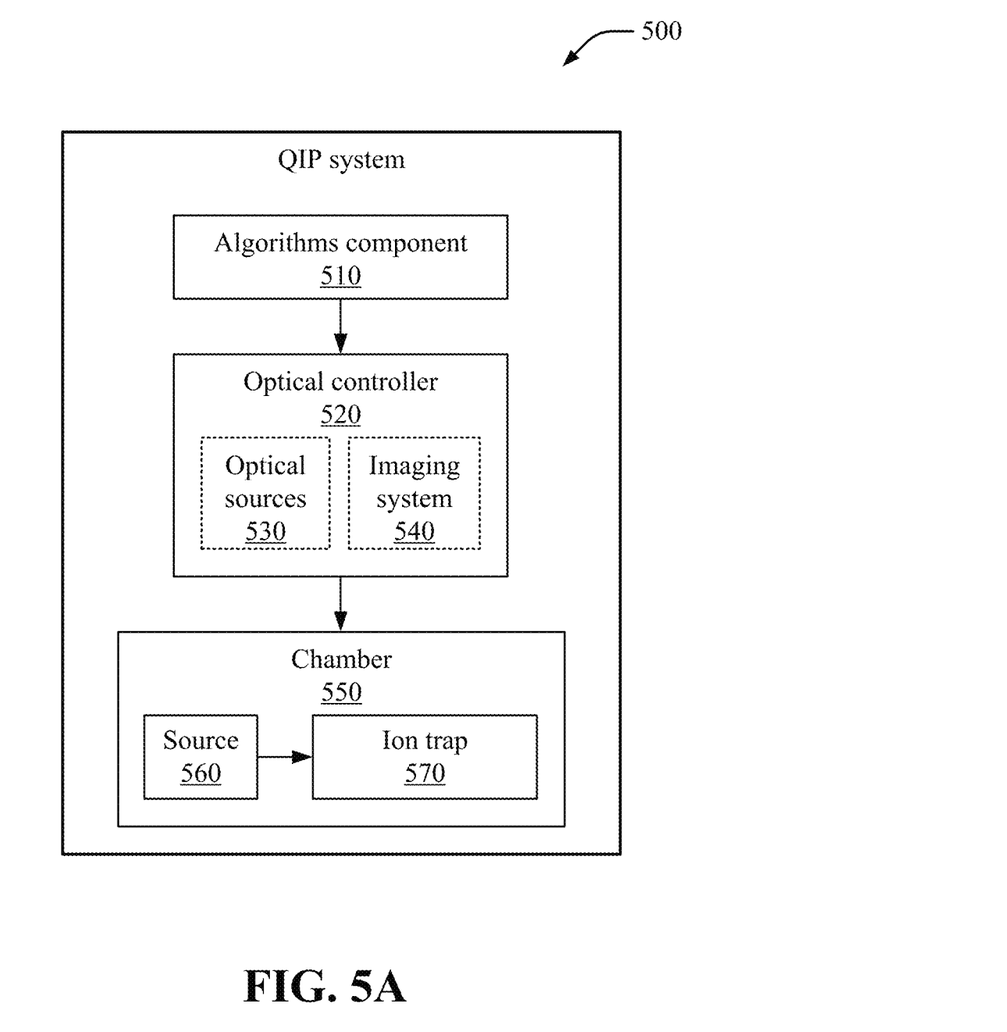
FIG. 5A is a block diagram that illustrates an example of a quantum information processing (QIP) system in accordance with aspects of this disclosure.

FIG. 5A is a block diagram that illustrates an example of a QIP system 500 in accordance with aspects of this disclosure. The QIP system 500 may also be referred to as a quantum computing system, a computer device, a trapped ion system, a trapped ion quantum computer, or the like. In an aspect, the QIP system 500 may be configured to perform quantum computations and quantum experiments. Moreover, the QIP system 500 may be configured to perform a fast experiment to measure the response of individual ions to respective laser beams at the conclusion of an experimental cycle (e.g., every few milliseconds) in order to stabilize the laser beam intensity associated with each individual ion as often as possible over time. This stabilization procedure may be performed in parallel for multiple laser beams and their associated ions.

Figure 5B:
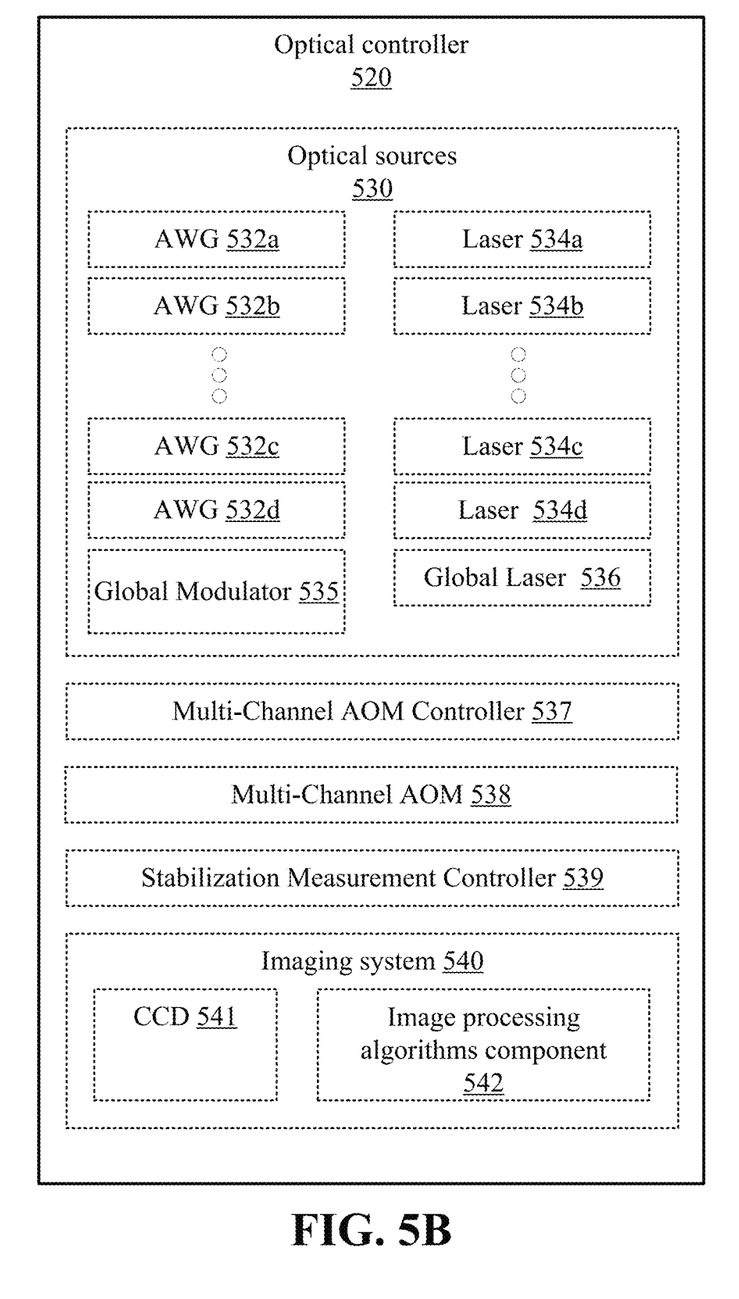
FIG. 5B is a block diagram that illustrates an example of an optical controller in accordance with aspects of this disclosure

The QIP system 500 can include a source 560 that provides atomic species (e.g., a flux of neutral atoms) to a chamber 550 having an ion trap 570 that traps the atomic species once ionized (e.g., photoionized) by an optical controller 520 (see e.g., FIG. 5B). The ion trap 570 may be used to trap ions into a linear array such as the linear crystal 110 described above in connection with the diagrams 100 and 300 in FIGS. 1 and 3, respectively. Optical sources 530 in the optical controller 520 may include one or more laser sources (e.g., sources of optical or laser beams) that can be used for ionization of the atomic species, control of the atomic ions, for fluorescence of the atomic ions that can be monitored and tracked by image processing algorithms operating in an imaging system 540 in the optical controller 520, and/or to perform the optical control functions described in this disclosure in connection with laser beam intensity stabilization. The optical sources 530 may be configured to control and generate a linear array of laser beams such as, for example, the laser beams 210a-201d described above in connection with the diagram 300 in FIG. 3. In an aspect, the optical sources 530 may be implemented separately from the optical controller 520.

The imaging system 540 can include a high resolution imager (e.g., CCD camera) for monitoring the atomic ions while they are being provided to the ion trap 570 or after they have been provided to the ion trap 570. In an aspect, the imaging system 540 can be implemented separate from the optical controller 520, however, the use of fluorescence to detect, identify, and label atomic ions using image processing algorithms may need to be coordinated with the optical controller 520. The imaging system 540 may be an example of the imaging system 360 described above in connection with the diagram 300 in FIG. 3. Accordingly, the imaging system 540 may be configured to image and analyze the effects of the interaction between the linear array of laser beams produced by the optical sources 530 and their respective linear array of ions trapped in the ion trap 570.

The QIP system 500 may also include an algorithms component 510 that may operate with other parts of the QIP system 500 (not shown) to perform quantum algorithms or quantum operations, including a stack or sequence of combinations of single qubit operations and/or multi-qubit operations (e.g., two-qubit operations) as well as extended quantum computations. As such, the algorithms component 510 may provide instructions to various components of the QIP system 500 (e.g., to the optical controller 520) to enable the implementation of the quantum algorithms or quantum operations.

FIG. 5B shows at least a portion of the optical controller 520. In this example, the optical controller 520 may include the optical sources 530 and the imaging system 540. As shown by the dotted lines, one or both of the optical sources 530 and the imaging system 540 may be optionally implemented separate from, but in communication with, the optical controller 520.

The imaging system 540 may include a CCD 541 (or similar imager or camera) and an image processing algorithms component 542 to process the information captured by the CCD 541. The imaging system 540 may be used to detect the outcome of the measurements described herein for fast calibration or fast stabilization of laser beam intensities. The optical sources 530 may include AWGs (or DDSs) 532a-532d and lasers 534a-534d, which may be used to control the ions in the ion trap 570. The AWGs 532a-532d may be examples of the waveform generators 350a-350d described above in connection with the diagram 300 in FIG. 3, while the lasers 534a-534d may be used to generate the linear array of laser beams 210a-210d also shown in the diagram 300. The optical sources 530 may also include a global modulator 535 and a global laser 536 for emitting and controlling the global Raman laser beam 220.

The optical controller 520 may include a multi-channel AOM controller 537 configured to control the operations of a multi-channel AOM 538, which may respectively correspond to the multi-channel AOM controller 380 and the multi-channel AOM 330 described above. The multi-channel AOM 538 may be implemented using a single AOM device with multiple channels, multiple AOM devices with a single channel, or multiple AOM devices with multiple and/or single channels.

The optical controller 520 may further include a stabilization measurement controller 539 that may correspond to the stabilization measurement controller 370 described above. The stabilization measurement controller 539 may include an integrating filter (not shown). The integrating filter, or integrator, is a device or component whose output signal is the time integral of its input signal. That is, an integrating filter accumulates the input quantity over a defined time to produce a representative output. The integrating filter may be used to filter out the effects of shot noise produced by multiple measurements made as part of the laser beam intensity stabilization described herein. The integrating filter may be an example of the integrating filter 375 described above.

It is to be understood that one or more of the components or subcomponents of the optical controller 520 may be implemented separate from the optical controller 520. Moreover, one or more of the components or subcomponents of the optical controller 520 may be implemented as part of one or more integrated circuits (e.g., FPGA, ASIC, central processing unit, microprocessor). In one example, the multi-channel AOM controller 537 and the stabilization measurement controller 539 may be implemented as a single component on a same integrated circuit or as separate components in different integrated circuits. When in a same integrated circuit, the multi-channel AOM controller 537 and the stabilization measurement controller 539 may use an internal 32-bit number $A_i$, where the 16 MSBs of $A_i$ are the physical bits and the 16 LSBs of $A_i$ are non-physical bits, and the 16 LSBs of $A_i$ may be truncated for output.

Figure 6:
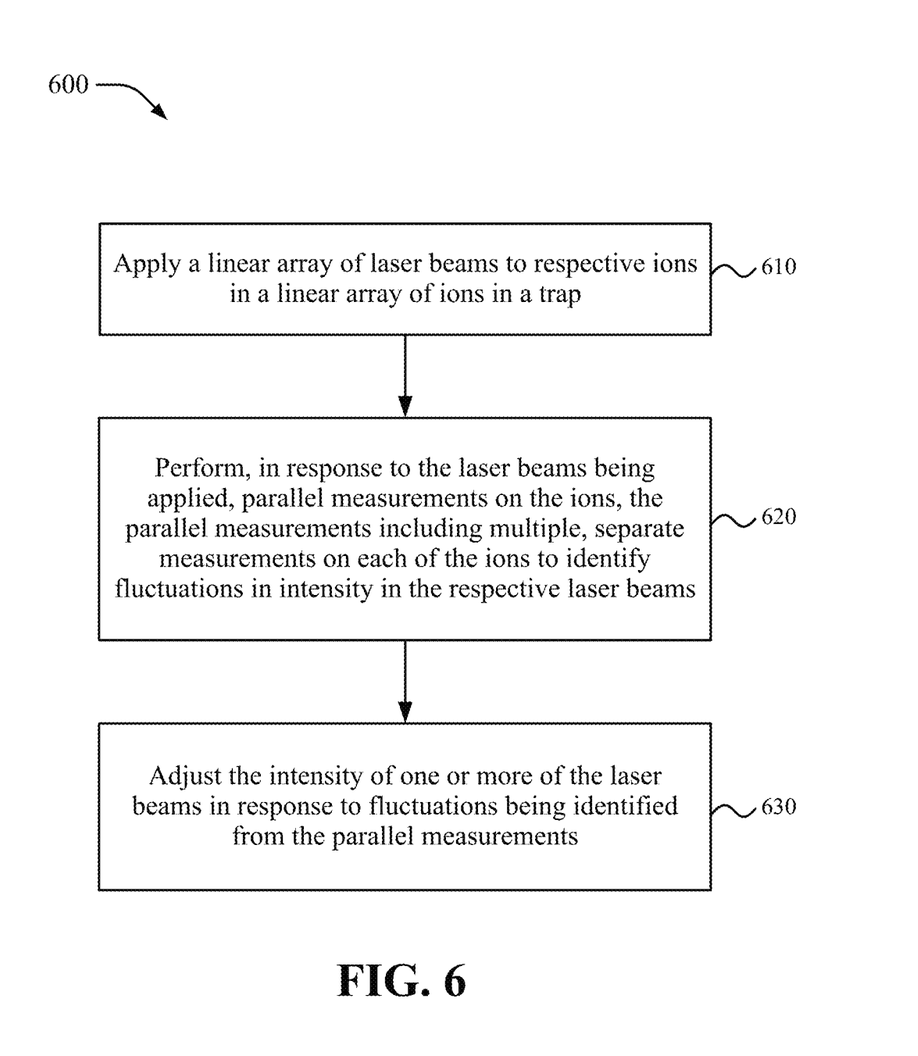
FIG. 6 is a flow diagram that illustrates an example of a method in accordance with aspects of this disclosure

Referring to FIG. 6, a method 600 for intensity stabilization of laser beams in a trapped ion system. In an aspect, the functions of the method 600 may be performed by one or more components of a trapped ion system or a QIP system such as the QIP system 500 and its components (e.g., optical controller 520 and its components or subcomponents).

At 610, the method 600 includes applying a linear array of laser beams (e.g., the laser beams 210a-210d) to respective ions in a linear array of ions (e.g., the ions 106a-106d) in a trap (e.g., the ion trap 570).

At 620, the method 600 includes performing, in response to the laser beams being applied, parallel measurements on the ions (e.g., by the imaging system 360), where the parallel measurements including multiple, separate measurements on each of the ions to identify fluctuations in intensity in the respective laser beams at each ion. For example, the measurements may be performed subsequent (e.g., immediately after) to the application of the laser beams.

At 630, the method 600 includes adjusting the intensity of one or more of the laser beams (e.g., by the stabilization measurement controller 370, the multi-channel AOM controller 380, and/or the waveform generators 350a-350d) in response to fluctuations being identified from the parallel measurements.

The method 600 generally corresponds to a sequence in which pulse laser beams are applied, the ion states are measured in parallel, and the laser beam powers may be updated based on the measurements. Such a sequence can be repeated multiple times.

In an aspect of the method 600, each of the multiple, separate measurements on a particular ion is a measurement of a response of that ion to the respective laser beam.

In an aspect of the method 600, performing the parallel measurements includes performing an integrating filtering (e.g., by the integrating filter 375) of the multiple, separate measurements on each of the ions to identify fluctuations in intensity in the respective laser beams.

In an aspect of the method 600, adjusting the intensity of one or more of the laser beams includes controlling each of the laser beams using a RF signal that is applied to a respective channel in a multi-channel AOM (e.g., the multi-channel AOM 330). The controlling of each of the laser beams using an RF signal includes adjusting an amplitude of the RF signal in response to the identification of fluctuations in intensity in the respective laser beam.

In another aspect of the method 600, for each of the multiple, separate measurements on a particular ion, the method 600 includes preparing the ion to a quantum state, $|0\rangle$, where the respective laser beam is applied to that ion for a fixed period of time t that produces an equal superposition of the $|0\rangle$ and $|1\rangle$ quantum states if the intensity of the laser beam is correct, and with a frequency that drives Rabi flopping (see e.g., FIG. 4) of the ion between the $|0\rangle$ and $|1\rangle$ quantum states, and measuring (e.g., by the imaging system 360) a response of the ion to the application of the respective laser beam as either a "1" or a "0", wherein the "1" is indicative of a bright state of the ion and the "0" is indicative of a dark state of the ion. The fixed period of time t may be set to drive a laser beam pulse that is an odd multiple of $$\frac{\pi}{2},$$

where higher odd multiples of $$\frac{\pi}{2}$$

are more sensitive to fluctuations in intensity than lower odd multiples of $$\frac{\pi}{2}.$$

Moreover, the fixed period of time t may be set to drive a $$\frac{9\pi}{2}$$

laser beam pulse.

In another aspect of the method 600, each laser beam has a diameter of approximately 1 μm-1.5 μm at the position of the respective ion, and the ions in the linear array of ions are separated from each other by a distance of approximately 5 μm.

In another aspect of the method 600, the method 600 is performed at an end of an experimental cycle on the trapped ion system (e.g., the QIP system 500), and may be performed between sequential experimental cycles on the trapped ion system. Overall, the method 600 may be performed in less than 1 millisecond, which is substantially faster than existing methods that are not performed in parallel.

In an aspect of the method 600, controlling each of the laser beams using an RF signal includes adjusting a first digital number, A, corresponding to an amplitude of the RF signal, based on a second digital number, B, corresponding to a gain of a feedback loop of the multiple, separate measurements, in response to the identification of fluctuations in intensity in the respective laser beam. The most significant bits (MSBs) of the first digital number, A, are bits representative of a physical value of an amplitude of the respective RF signal.

In another aspect of the method 600, each of the measurements may involve first, preparing each ion in the chain that is to be measured in the quantum state $|0\rangle$. Next, the respective laser beam of each ion to be measured is turned on for a fixed length of time t, with frequency set so as to drive Rabi flopping between the $|0\rangle$ and $|1\rangle$ quantum states. The time t for which each of the laser beams is on is set such that if the laser beam power or intensity is correct, the respective ion is driven into an equal superposition of the $|0\rangle$ and $|1\rangle$ quantum states. The state of each ion is then measured as either a "0" or a "1", where the "1" is indicative of a bright state of the ion and the "0" is indicative of a dark state of the ion.

In general, the techniques described herein in connection with FIGS. 1-6 described above may be implemented using a system for intensity stabilization of laser beams in a trapped ion system. The system may include laser sources configured to apply a linear array of laser beams to respective ions in a linear array of ions in a trap, an imaging system configured to perform, while the laser beams are being applied, parallel measurements on the ions, the parallel measurements including multiple, separate measurements on each of the ions to identify fluctuations in intensity in the respective laser beams at each ion, and an optical controller configured to adjust the intensity of one or more of the laser beams in response to fluctuations being identified from the parallel measurements.

In another aspect of the system described in connection with FIGS. 1-6, each of the multiple, separate measurements on a particular ion is a measurement of a response of that ion to the respective laser beam. For each of the multiple, separate measurements on a particular ion the optical controller is configured to prepare the ion to a quantum state, $|0\rangle$, where the respective laser beam is applied to that ion for a fixed period of time t that produces an equal superposition of the $|0\rangle$ and $|1\rangle$ quantum states if the intensity of the laser beam is correct, and with a frequency that drives Rabi flopping of the ion between the $|0\rangle$ and $|1\rangle$ quantum states, and the imaging system is configured to measure a response of the ion to the application of the respective laser beam as either a "1" or a "0", wherein the "1" is indicative of a bright state of the ion and the "0" is indicative of a dark state of the ion. The fixed period of time t may be set to drive a laser beam pulse that is an odd multiple of $$\frac{\pi}{2},$$

wherein higher odd multiples of $$\frac{\pi}{2}$$

are more sensitive to fluctuations in intensity than lower odd multiples of $$\frac{\pi}{2}.$$

The fixed period of time t may be set to drive a $$\frac{9\pi}{2}$$

laser beam pulse.

In another aspect of the system described in connection with FIGS. 1-6, the optical controller is further configured to perform an integrating filtering of the multiple, separate measurements on each of the ions to identify fluctuations in intensity in the respective laser beams. The optical controller configured to adjust the intensity of one or more of the laser beams is further configured to control each of the laser beams using an RF signal that is applied to a respective channel in a multi-channel AOM. The optical controller configured to control each of the laser beams using an RF signal is further configured to adjust an amplitude of the RF signal in response to the identification of fluctuations in intensity in the respective laser beam. The optical controller configured to control each of the laser beams using an RF signal is further configured to adjust a first digital number, A, corresponding to an amplitude of the RF signal, with a second digital number, B, corresponding to a gain of a feedback loop of the multiple, separate measurements, in response to the identification of fluctuations in intensity in the respective laser beam. The MSBs of the first digital number, A, are bits representative of a physical value of an amplitude of the respective RF signal.

In another aspect of the system described in connection with FIGS. 1-6, each laser beam has a diameter of approximately 1 μm-1.5 μm at the position of the respective ion, and the ions in the linear array of ions are separated from each other by a distance of approximately 5 μm.

In another aspect of the system described in connection with FIGS. 1-6, the imaging system is configured to perform the parallel measurements at an end of an experimental cycle on the trapped ion system. The imaging system is configured to perform the parallel measurements between experimental cycles on the trapped ion system. The imaging system is configured to perform the parallel measurements in less than 1 millisecond.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for stabilizing laser beams in a quantum computing system, the method comprising:
    applying an array of laser beams to respective ions in an ion trap of the quantum computing system;
    performing at least one separate measurement directly on each of the ions to identify fluctuations in intensity in the respective laser beams of the array of laser beams; and
    adjusting the intensity of one or more of the laser beams in response to fluctuations identified from the at least one separately measurement of each of the ions.

2. The method of claim 1, wherein the performing of the at least one separate measurement comprises performing, in response to the laser beams being applied, parallel measurements on the ions.

3. The method of claim 2, wherein the at least one separate measurement comprises multiple, separate measurements on a particular ion that is a measurement of a response of that ion to the respective laser beam.

4. The method of claim 3, wherein the performing of the parallel measurements includes performing an integration of the multiple, separate measurements on each of the ions to identify fluctuations in intensity in the respective laser beams.

5. The method of claim 1, wherein, for the at least one measurement on a respective ion of the ions in the ion trap, the method further comprises:
    preparing the ion to a quantum state, |0>, wherein the respective laser beam is applied to that ion for a fixed period of time t that produces an equal superposition of the |0> and |1> quantum states if the intensity of the laser beam is correct, and with a frequency that drives Rabi flopping of the ion between the |0> and |1> quantum states; and
    measuring a response of the ion to the application of the respective laser beam as either a "1" or a "0", wherein the "1" is indicative of a bright state of the ion and the "0" is indicative of a dark state of the ion.

6. The method of claim 5, wherein the fixed period of time t is set to drive a laser beam pulse that is an odd multiple of $$\frac{\pi}{2},$$

wherein higher odd multiples of $$\frac{\pi}{2}$$

are more sensitive to fluctuations in intensity than lower odd multiples of $$\frac{\pi}{2}.$$

7. The method of claim 5, wherein the fixed period of time t is set to drive a $$\frac{9\pi}{2}$$

laser beam pulse.

8. The method of claim 1, wherein the adjusting of the intensity of the one or more laser beams includes controlling the one or more laser beams using a radio frequency (RF) signal that is applied to a respective channel in a multi-channel acousto-optic modulator (AOM).

9. The method of claim 8, wherein the controlling of each of the one or more laser beams using the RF signal includes adjusting an amplitude of the RF signal in response to the identification of fluctuations in intensity in the respective laser beam.

10. The method of claim 8,
    wherein controlling each of the one or more laser beams using the RF signal includes adjusting a first digital number, A, corresponding to an amplitude of the RF signal, based on a second digital number, B, corresponding to a gain of a feedback loop of the multiple, separate measurements, in response to the identification of fluctuations in intensity in the respective laser beam, and
    wherein the most significant bits (MSBs) of the first digital number, A, are bits representative of a physical value of an amplitude of the respective RF signal.

11. The method of claim 1, wherein:
    each laser beam of the array of laser beams has a diameter of approximately 1 µm to 1.5 µm at a respective position of the respective ion, and
    the ions in the ion trap are separated from each other by a distance of approximately 5 µm.

12. A system for stabilizing laser beams in a quantum computing system, comprising:
    laser sources configured to apply an array of laser beams to respective ions in an ion trap of the quantum computing system;
    an imaging system configured to perform at least one separate measurement directly on each of the ions to identify fluctuations in intensity in the respective laser beams of the array of laser beams; and
    an optical controller configured to adjust the intensity of one or more of the laser beams in response to fluctuations identified from the at least one separately measurement of each of the ions.

13. The system of claim 12, wherein the imaging system is further configured to perform the at least one separate measurement by performing, in response to the laser beams being applied, parallel measurements on the ions.

14. The system of claim 13,
    wherein the at least one separate measurement comprises multiple, separate measurements on a particular ion that is a measurement of a response of that ion to the respective laser beam, and wherein the imaging system is further configured to perform the parallel measurements by performing an integration of the multiple, separate measurements on each of the ions to identify fluctuations in intensity in the respective laser beams.

15. The system of claim 12, wherein, for the at least one measurement on a respective ion of the ions in the ion trap, the imaging system is further configured to:
prepare the ion to a quantum state, |0>, wherein the respective laser beam is applied to that ion for a fixed period of time t that produces an equal superposition of the |0> and |1> quantum states if the intensity of the laser beam is correct, and with a frequency that drives Rabi flopping of the ion between the |0> and |1> quantum states; and
measure a response of the ion to the application of the respective laser beam as either a "1" or a "0", wherein the "1" is indicative of a bright state of the ion and the "0" is indicative of a dark state of the ion.

16. The system of claim 15, wherein the fixed period of time t is set to drive a laser beam pulse that is an odd multiple of $$\frac{\pi}{2},$$

wherein higher odd multiples of $$\frac{\pi}{2}$$

are more sensitive to fluctuations in intensity than lower odd multiples of $$\frac{\pi}{2}.$$

17. The system of claim 15, wherein the fixed period of time t is set to drive a $$\frac{9\pi}{2}$$

laser beam pulse.

18. The system of claim 1, wherein the optical controller is further configured to adjust the intensity of the one or more laser beams by:
controlling the one or more laser beams using a radio frequency (RF) signal that is applied to a respective channel in a multi-channel acousto-optic modulator (AOM), and
adjusting an amplitude of the RF signal in response to the identification of fluctuations in intensity in the respective laser beam.

19. The system of claim 18,
wherein the optical controller is further configured to control each of the one or more laser beams using the RF signal by adjusting a first digital number, A, corresponding to an amplitude of the RF signal, based on a second digital number, B, corresponding to a gain of a feedback loop of the multiple, separate measurements, in response to the identification of fluctuations in intensity in the respective laser beam, and
wherein the most significant bits (MSBs) of the first digital number, A, are bits representative of a physical value of an amplitude of the respective RF signal.

20. The system of claim 12, wherein:
each laser beam of the array of laser beams has a diameter of approximately 1 μm to 1.5 μm at a respective position of the respective ion, and
the ions in the ion trap are separated from each other by a distance of approximately 5 μm.

* * * * *